United States Patent
Nakano et al.

(10) Patent No.: US 9,185,310 B2
(45) Date of Patent: Nov. 10, 2015

(54) SOLID-STATE IMAGING DEVICE, ILLUMINANCE MEASURING METHOD PERFORMED BY SOLID-STATE IMAGING DEVICE, AND CAMERA MODULE

(71) Applicant: Kabushiki Kaisha Toshiba, Tokyo (JP)

(72) Inventors: Teppei Nakano, Kanagawa (JP); Keizo Tashiro, Kanagawa (JP); Junichi Hosokawa, Kanagawa (JP); Naoto Mihara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 166 days.

(21) Appl. No.: 13/753,694

(22) Filed: Jan. 30, 2013

(65) Prior Publication Data

US 2013/0229552 A1 Sep. 5, 2013

(30) Foreign Application Priority Data

Mar. 5, 2012 (JP) ................................. 2012-048167

(51) Int. Cl.
*H04N 5/335* (2011.01)
*H04N 5/235* (2006.01)

(52) U.S. Cl.
CPC .............. *H04N 5/335* (2013.01); *H04N 5/2351* (2013.01); *H04N 5/2352* (2013.01)

(58) Field of Classification Search
CPC ............ H04N 5/2355; H04N 5/35536; H04N 5/35581; H04N 5/235; H04N 5/2353; H04N 5/353; H04N 5/2356
USPC ............................................... 348/222.1, 294
See application file for complete search history.

(56) References Cited

U.S. PATENT DOCUMENTS

| | | | |
|---|---|---|---|
| 6,421,086 B1 | 7/2002 | Kuno et al. | |
| 7,978,227 B2 * | 7/2011 | Oda .......................... | 348/221.1 |
| 8,531,550 B2 * | 9/2013 | Fossum et al. ............. | 348/229.1 |
| 2004/0218830 A1 * | 11/2004 | Kang et al. ..................... | 382/274 |
| 2005/0195314 A1 * | 9/2005 | Fossum et al. ................ | 348/362 |
| 2007/0216957 A1 * | 9/2007 | Kamon et al. ................ | 358/296 |
| 2008/0151086 A1 * | 6/2008 | Nakayama .................... | 348/296 |
| 2010/0007780 A1 * | 1/2010 | Nishihara ..................... | 348/311 |
| 2012/0057047 A1 * | 3/2012 | Fossum et al. ............. | 348/229.1 |
| 2012/0086840 A1 * | 4/2012 | Xhakoni et al. ............... | 348/297 |
| 2012/0177352 A1 * | 7/2012 | Pillman et al. .................. | 396/61 |
| 2013/0076935 A1 * | 3/2013 | Morita ....................... | 348/222.1 |

FOREIGN PATENT DOCUMENTS

| | | |
|---|---|---|
| JP | 11-18002 | 1/1999 |
| JP | 2002-238000 | 8/2002 |
| JP | 2009-10697 | 1/2009 |
| JP | 2011-4188 | 1/2011 |

\* cited by examiner

*Primary Examiner* — Pritham Prabhakher
(74) *Attorney, Agent, or Firm* — Oblon, McClelland, Maier & Neustadt, L.L.P.

(57) ABSTRACT

According to one embodiment, a solid-state imaging device includes an illuminance value calculating unit and an illuminance value output unit. The illuminance value calculating unit calculates an illuminance value based on an integration result of luminance values. The illuminance value output unit outputs the illuminance value calculated by the illuminance value calculating unit by setting, as a target, a subject image obtained through application of one of two or more illuminance measurement conditions. The two or more illuminance measurement conditions are set in advance by varying at least one of an electronic shutter time and an analog gain.

3 Claims, 3 Drawing Sheets

SOLID-STATE IMAGING DEVICE, ILLUMINANCE MEASURING METHOD PERFORMED BY SOLID-STATE IMAGING DEVICE, AND CAMERA MODULE

CROSS-REFERENCE TO RELATED APPLICATIONS

This application is based upon and claims the benefit of priority from Japanese Patent Application No. 2012-048167, filed on Mar. 5, 2012; the entire contents of which are incorporated herein by reference.

FIELD

Embodiments generally relate to a solid-state imaging device, an illuminance measuring method performed by the solid-state imaging device, and a camera module.

BACKGROUND

According to the related art, technologies for detecting illuminance using a solid-state imaging element such as a complementary metal oxide semiconductor (CMOS) image sensor have been suggested. For example, camera modules can adjust the lightness of a display screen in accordance with the detected illuminance. As a method of detecting illuminance by a solid-state imaging element, for example, there is a known a method of aggregating luminance values detected with pixels and setting the average of the luminance values on the entire imaging screen as an illuminance value.

In a CMOS image sensor, a dynamic range obtained under an optimum exposure condition is generally a range from 10 bits to 12 bits due to the restrictions on conversion accuracy in an analog-to-digital converter (ADC) for each pixel, the number of saturated electrons of a pixel, or the like. On the other hand, a general illuminance sensor can acquire illuminance values of a dynamic range of about 16 bits. Accordingly, in CMOS image sensor according to the related art, a technology for converging an electronic shutter (ES) time or an analog gain (AG) on an optimum condition under which an illuminance value is calculated has been disclosed to acquire the illuminance values of the same dynamic range as that of the illuminance sensor.

For example, when a gray scale disappears due to so-called overexposure in which saturation of an output occurs with respect to the amount of incident light from a subject, an illuminance value is measured by suppressing the overexposure by shortening the ES time or reducing the AG. When a gray scale disappears due to so-called underexposure in which an output remains to be in a black level with respect to a change in the amount of incident light from a subject, an illuminance value is measured by suppressing the underexposure by increasing the ES time or the AG. The CMOS image sensor converges into an optimum condition by gradually updating the ES time and the AG.

According to the technology of the related art, for example, in regard to a change in an illuminance condition such as movement of a camera, the ES time and the AG are updated about several tens of times to converge the condition. In order to acquire an accurate illuminance value, a wait is necessary until the convergence of the condition to suppress the overexposure and underexposure as much as possible. Therefore, it takes long time to acquire the illuminance value. As a frame rate is further decreased to reduce power consumption, it takes longer time until the acquisition of the illuminance value. Further, the time until the acquisition of the illuminance value is frequently changed, since the number of time the ES time and the AG are updated is varied in accordance with an imaging condition or the like.

DETAILED DESCRIPTION

In general, according to one embodiment, a solid-state imaging device includes an imaging unit, an integration unit, an illuminance value calculating unit, and an illuminance value output unit. The imaging unit captures a subject image. The integration unit integrates luminance values. The luminance value is detected in each pixel in the imaging unit. The illuminance value calculating unit calculates an illuminance value based on an integration result of the integration unit. The illuminance value output unit outputs the illuminance value calculated by the illuminance value calculating unit. The imaging unit is able to perform the imaging in accordance with two or more illuminance measurement conditions. The two or more illuminance measurement conditions are set in advance by varying at least one of an electronic shutter time and an analog gain. The illuminance value output unit outputs the illuminance value calculated by the illuminance value calculating unit by setting, as a target, the subject image obtained through application of one of the two or more illuminance measurement conditions.

Hereinafter, a solid-state imaging device, an illuminance measuring method performed by the solid-state imaging device, and a camera module according to an embodiment will be described in detail with reference to the appended drawings. Further, the invention is not limited to the following embodiment.

Figure 1:
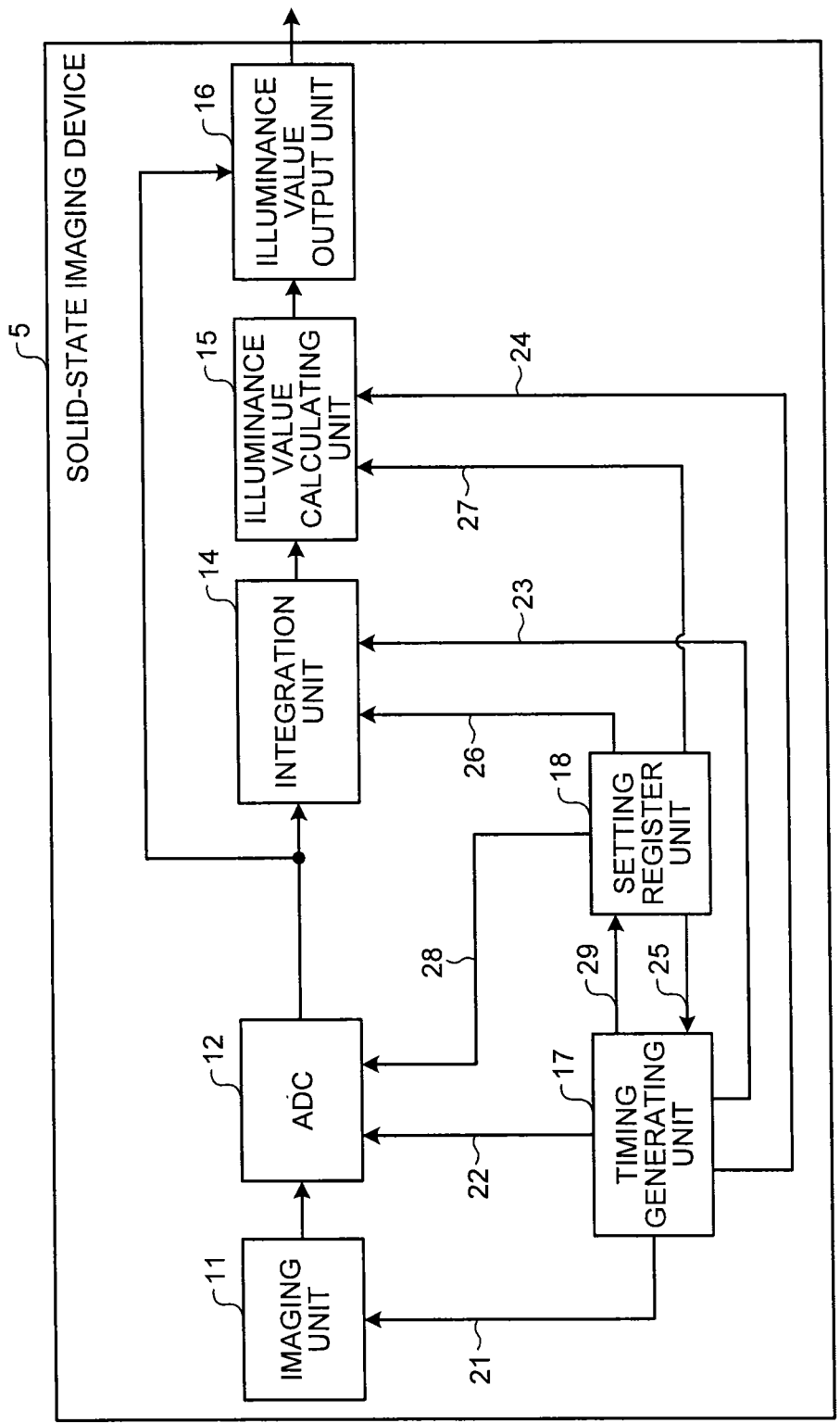
FIG. 1 is a block diagram illustrating the configuration for calculation of an illuminance value in a solid-state imaging device according to an embodiment.
Figure 2:
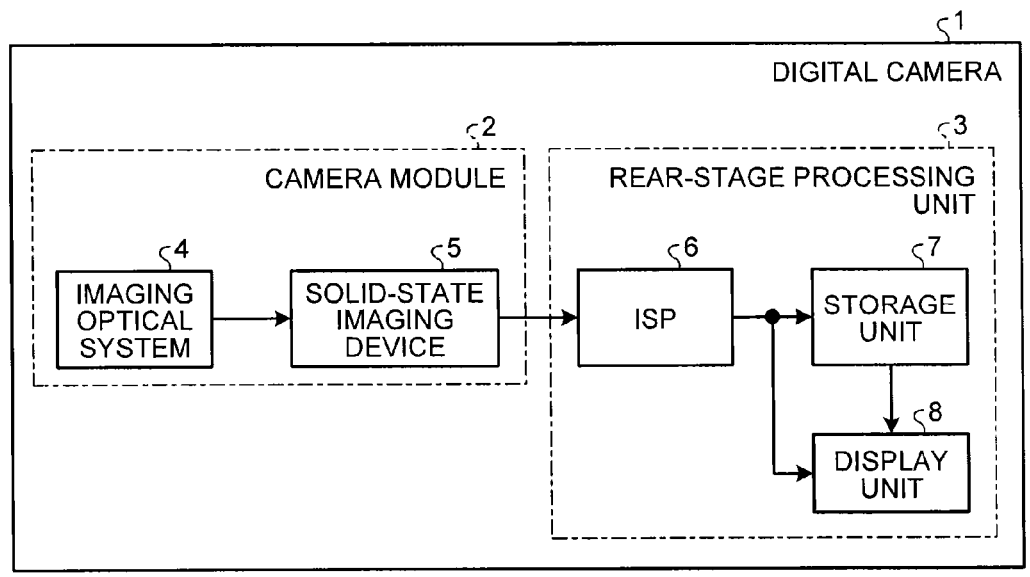
FIG. 2 is a block diagram illustrating the overall configuration of a digital camera including the solid-state imaging device illustrated in FIG. 1.

FIG. 1 is a block diagram illustrating a configuration for calculation of an illuminance value in the solid-state imaging device according to the embodiment. FIG. 2 is a block diagram illustrating the overall configuration of a digital camera including the solid-state imaging device illustrated in FIG. 1.

A digital camera 1 includes a camera module 2 and a rear-stage processing unit 3. The camera module 2 includes an imaging optical system 4 and a solid-state imaging device 5. The rear-stage processing unit 3 includes an image signal processor (ISP) 6, a storage unit 7, and a display unit 8. The camera module 2 is applied not only to the digital camera 1 but also to an electronic device such as a camera-attached portable terminal.

The imaging optical system 4 acquires light from a subject and forms a subject image. The solid-state imaging device 5 generates an image signal by capturing the subject image. The ISP 6 performs signal processing on an image signal from the solid-state imaging device 5. The storage unit 7 stores an image subjected to the signal processing by the ISP 6. The storage unit 7 outputs the image signal to the display unit 8 in response to a user's operation or the like. The display unit 8 displays an image according to the image signal input from the ISP 6 or the storage unit 7. The display unit 8 is, for example, a liquid crystal display.

The solid-state imaging device 5 includes an imaging unit 11, an analog-to-digital converter (ADC) 12, an integration unit 14, an illuminance value calculating unit 15, an illuminance value output unit 16, a timing generating unit 17, and a setting register unit 18.

The imaging unit 11 converts the light acquired by the imaging optical system 4 into a signal charge by a photodiode to capture a subject image. The imaging unit 11 detects a luminance value of each pixel and generates an analog image signal. The imaging unit 11 is, for example, a complementary metal oxide semiconductor (CMOS) image sensor. The imaging unit 11 may be a charge coupled device (CCD) or a single-pixel photodiode, as well as the CMOS image sensor.

The ADC 12 converts an image signal of an analog system from the imaging unit 11 into an image signal of a digital system and outputs the converted image signal to the integration unit 14 and the illuminance value output unit 16. The ADC 12 multiplies the image signal from the imaging unit 11 by an analog gain (AG).

The integration unit 14 integrates the luminance values input from the ADC 12. The illuminance value calculating unit 15 calculates an illuminance value based on the integration result of the integration unit 14. The illuminance value output unit 16 outputs the illuminance value calculated by the illuminance value calculating unit 15. The illuminance value output unit 16 specifies an illuminance value to be output in regard to the image signal from the ADC 12, referring to the number of overexposed pixels and the number of underexposed pixels. The overexposed pixels are pixels in which saturation of an output occurs with respect to the amount of incident light from a subject. The underexposed pixels are pixels in which an output remains to be in a black level with respect to a change in the amount of incident light from the subject.

The timing generating unit 17 controls the driving timings of the imaging unit 11, the ADC 12, the integration unit 14, and the illuminance value calculating unit 15. The timing generating unit 17 generates an imaging control signal 21 used to control the driving timing of the imaging unit 11 and outputs the imaging control signal 21 to the imaging unit 11. The timing generating unit 17 generates an AD conversion control signal 22 used to control the driving timing of the ADC 12 and outputs the AD conversion control signal 22 to the ADC 12. The timing generating unit 17 generates an integration control signal 23 used to control the driving timing of the integration unit 14 and outputs the integration control signal 23 to the integration unit 14. The timing generating unit 17 generates an illuminance value calculation control signal 24 used to control the driving timing of the illuminance value calculating unit 15 and outputs the illuminance value calculation control signal 24 to the illuminance value calculating unit 15. The timing generating unit 17 outputs a setting read request 29 used to read a timing generation setting value 25 suitable for an illuminance measurement condition to the setting register unit 18.

The setting register unit 18 functions as a setting value retaining unit that retains the timing generation setting value 25, an integration setting value 26, an illuminance value calculation setting value 27, and AG information 28 which are set in advance. The setting register unit 18 outputs the timing generation setting value 25 to the timing generating unit 17. The timing generation setting value 25 includes information regarding an electronic shutter (ES) time. The setting register unit 18 outputs the integration setting value 26 to the integration unit 14. The setting register unit 18 outputs the illuminance value calculation setting value 27 to the illuminance value calculating unit 15. The setting register unit 18 outputs the AG information 28 to the ADC 12.

The imaging unit 11 is able to perform imaging in accordance with two or more illuminance measurement conditions set in advance by varying at least one of the ES time and the AG. For example, the solid-state imaging device 5 performs imaging in accordance with three illuminance measurement conditions set in advance by varying at least one of the ES time and the AG. In this embodiment, the solid-state imaging device 5 sets a product ES×AG of the ES time and the AG as the illuminance measurement condition. The setting register unit 18 preliminarily retains the ES time and the AG included in the illuminance measurement conditions.

Figure 3:
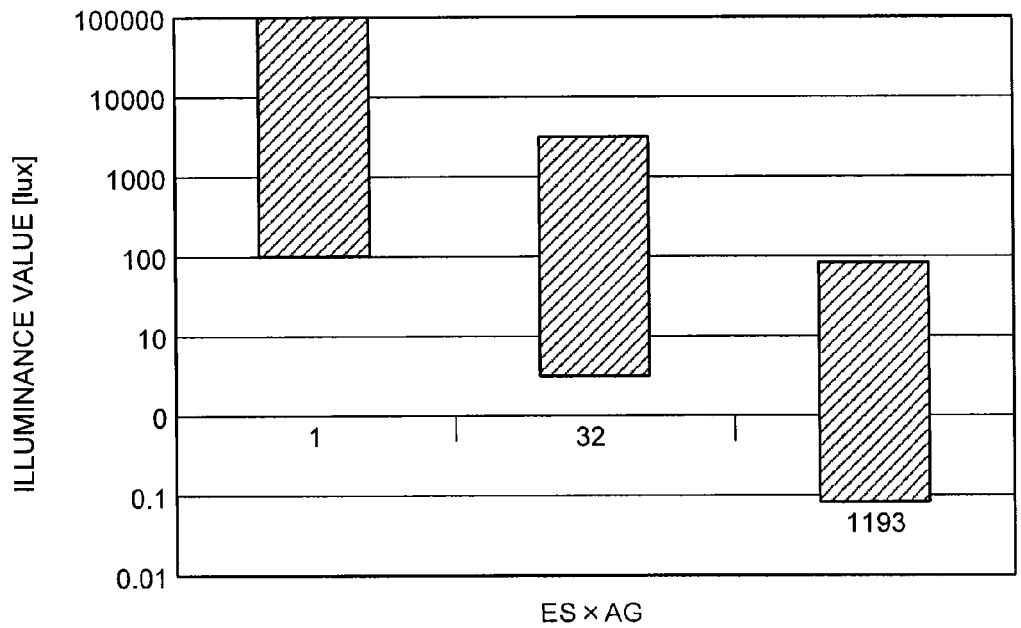
FIG. 3 is a diagram illustrating a setting example of an illuminance measurement condition.

FIG. 3 is a diagram illustrating a setting example of an illuminance measurement condition. Here, combinations of the ES×AG will be exemplified to acquire illuminance values from 100000 lux to 0.1 lux. In this embodiment, illuminance values (110000 lux to 0.09 lux) in a range larger the range from 100000 lux to 0.1 lux by 10% as a margin are assumed to be acquired.

For example, when the ADC 12 outputting a signal which has a dynamic range of 10 bits (64 dB) is applied, the solid-state imaging device 5 is able to acquire illuminance values of 1024 values in each ES×AG.

The ES×AG is assumed to be 1 when illuminance values from 110000 lux to 107 lux can be detected. As the ES × AGs, for example, about three of 1, 32, and 1193 are set. By appropriately overlapping the ranges of the illuminance values detectable in the ES×AGs, the solid-state imaging device 5 can easily maintain continuity for the illuminance values to be output between the illuminance measurement conditions.

The ES×AG set as the illuminance measurement condition is not limited to about the three methods, but two or more methods may be used. The number of ES×AGs set as the illuminance measurement condition may be appropriately changed in accordance with the bit resolution of the ADC 12 or the range of the detectable illuminance values. The illuminance measurement condition may be set not only by changing both of the ES time and the AG but also by changing only one of the ES time and the AG.

Figure 4:
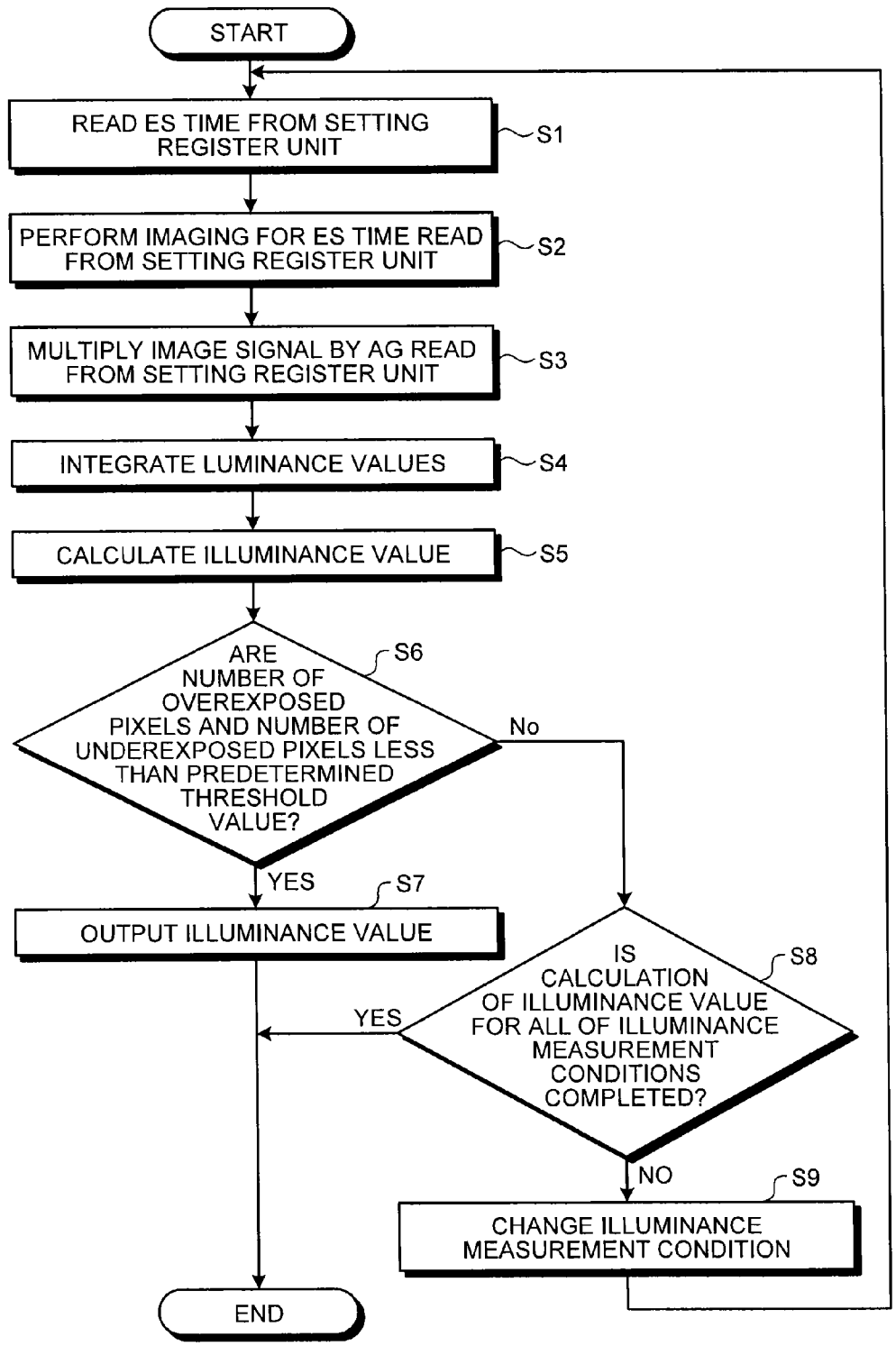
FIG. 4 is a flowchart illustrating an order until an illuminance value is output by the solid-state imaging device.

FIG. 4 is a flowchart illustrating an order until the illuminance value is output by the solid-state imaging device. The ES times set for the three methods of the ES×AGs are assumed to be longer in the order of the "ES×AG=1, 32, and 1193." Here, it is assumed that the solid-state imaging device 5 first performs imaging based on the "ES×AG=1193" which is the longest among the three methods of the ES×AGs, and then performs imaging by sequentially shortening the ES times of the "ES×AG=32 and 1. " Further, the order of the imaging under each illuminance measurement condition is not limited to the case in which the imaging is performed under the condition that the ES time is longer, but the imaging can be performed in any order.

The timing generating unit 17 outputs, to the setting register unit 18, the setting read request 29 used to read the ES time set for the "ES×AG=1193" as the timing generation setting value 25. The timing generating unit 17 reads the ES time from the setting register unit 18 (step S1).

The setting register unit 18 outputs the AG set for the "ES×AG=1193" to the ADC 12. The setting register unit 18 outputs the integration setting value 26 and the illuminance value calculation setting value 27 corresponding to the "ES×AG=1193."

The timing generating unit 17 generates and outputs the imaging control signal 21, the AD conversion control signal 22, the integration control signal 23, and the illuminance value calculation control signal 24 based on the ES time read from the setting register unit 18. The imaging unit 11 performs the imaging for the ES time read from the setting register unit 18 by the timing generation unit 17 in accordance with the imaging control signal 21 (step S2). The ADC 12 performs the AD conversion on the image signal from the imaging unit 11 in accordance with the AD conversion control signal 22.

The ADC 12 multiplies the image signal from the imaging unit 11 by the AG read from the setting register unit 18 (step S3). The integration unit 14 integrates the luminance values input from the ADC 12 in accordance with the integration control signal 23 (step S4).

For example, the integration unit 14 integrates the luminance values of the entire screen of one frame in accordance with the integration setting value 26. Further, the integration unit 14 may integrate the luminance values for a partial region of the screen of one frame. The integration unit 14 may integrate the luminance values for each region of a plurality of regions set inside a screen. The setting register unit 18 retains information regarding an integrating method performed by the integration unit 14 as the integration setting value 26. The integration unit 14 integrates the luminance values in accordance with the integration setting value 26.

The illuminance value calculating unit 15 performs calculation using the integration result of the integration unit 14 and calculates the illuminance value in accordance with the illuminance value calculation control signal 24 (step S5). The illuminance value calculating unit 15 calculates the illuminance value, for example, by applying the following expression.

Illuminance Value=(Integrated Value/Number of Integration Pixels)/(ES×AG)×k

In this expression, the integrated value is assumed to be the integration result of the integration unit 14. The number of integration pixels is assumed to be the number of pixels of which the luminance values are to be integrated in the integration unit 14. Further, it is assumed that "k" is a coefficient for fine adjustment of the illuminance value. The setting register unit 18 outputs information including the ES×AG (=1193) and the coefficient k as the illuminance value calculation setting value 27 to the illuminance value calculating unit 15. The illuminance value calculating unit 15 acquires the ES×AG and the coefficient k to be applied to the expression above from the illuminance value calculation setting value 27.

The illuminance value output unit 16 acquires the image signal considered to be the basis of the calculation of the illuminance value in the illuminance value calculating unit 15 from the ADC 12, and determines whether the number of overexposed pixels and the number of underexposed pixels are less than a threshold value (step S6).

When the number of overexposed pixels and the number of underexposed pixels are both less than a threshold value (Yes in step S6), the illuminance value output unit 16 outputs the illuminance value (step S7). The solid-state imaging device 5 outputs the illuminance value from the illuminance value output unit 16 and ends the illuminance measurement for the corresponding frame.

When at least one of the number of overexposed pixels and the number of underexposed pixels is equal to or greater than the threshold value (No in step S6), the illuminance value output unit 16 determines whether the calculation of the illuminance value for all of the illuminance measurement conditions is completed for the corresponding frame (step S8). When the illuminance value is not calculated for any one of the illuminance measurement conditions (No in step S8), the solid-state imaging device 5 changes the illuminance measurement condition (step S9) and repeats the order from step S1.

When the illuminance value is calculated for the "ES× AG=1193" and the illuminance values are not calculated for the "ES×AG=32 and 1," the solid-state imaging device 5 changes the illuminance measurement conditions to the "ES× AG=32" in step S8 and repeats the order from step S1.

When the number of overexposed pixels and the number of underexposed pixels are both less than the threshold value, as the "ES×AG=32" (Yes in step S6), the solid-state imaging device 5 outputs the illuminance value calculated for the "ES×AG=32" (step S7). When at least one of the number of overexposed pixels and the number of underexposed pixels is equal to or greater than the threshold value (No in step S6), the solid-state imaging device 5 changes the illuminance measurement condition to the "ES×AG=1" through steps S8 and S9, and then repeats the order from step S1.

When the number of overexposed pixels and the number of underexposed pixels are both less than the threshold value, as the "ES×AG=1" (Yes in step S6), the solid-state imaging device 5 outputs the illuminance value calculated for the "ES×AG=1" (step S7). When at least one of the number of overexposed pixels and the number of underexposed pixels is equal to or greater than the threshold value (No in step S6), the solid-state imaging device 5 ends the illuminance measurement for the corresponding frame without outputting the illuminance value calculated by the illuminance value calculating unit 15 due to the fact that the illuminance value is calculated for all of the illuminance measurement conditions for the corresponding frame (Yes in step S8).

The digital camera 1 adjusts the lightness of the display unit 8 (see FIG. 2) in accordance with the illuminance value calculated by the solid-state imaging device 5, for example, when the imaging is performed. The digital camera 1 can display a screen easily viewed under any illuminance environment by appropriately adjusting the lightness of the display unit 8 in accordance with the environmental illuminance at the imaging time.

For example, the digital camera 1 may control light emission of an operation key (not illustrated) in accordance with the illuminance value calculated by the solid-state imaging device 5. The digital camera 1 may use the illuminance value calculated by the solid-state imaging device 5 for any use. The digital camera 1 may output the illuminance value calculated by the solid-state imaging device 5, for example, by displaying the illuminance value on the display unit 8.

In the above-described order, when the illuminance value output unit 16 specifies the illuminance value for the illuminance measurement condition that the number of overexposed pixels and the number of underexposed pixels are less than the threshold value in step S6, the illuminance value calculating unit 15 pauses the calculation of the illuminance value for another illuminance measurement condition. Thus, the solid-state imaging device 5 ends the illuminance measurement for the corresponding frame. In this case, the solid-state imaging device 5 can output the illuminance value earlier without waiting for the calculation of the illuminance values for all of the illuminance measurement conditions.

After the illuminance value calculating unit 15 calculates the illuminance values for all of the illuminance measurement conditions, the illuminance value output unit 16 may output the illuminance value for one of the illuminance measurement conditions that the number of overexposed pixels and the number of underexposed pixels are less than the threshold value.

The illuminance value output unit 16 may output the illuminance value for all of the illuminance measurement conditions. The illuminance value output unit 16 may set, as a target, a subject image obtained by applying any one of the two or more illuminance measurement conditions and output the illuminance value calculated by the illuminance value calculating unit 15.

The illuminance value output unit 16 may output not only the illuminance value but also incidental information such as the number of pixels to be integrated by the integration unit 14. The illuminance value output unit 16 may count the number of pixels as another condition such as a condition that a luminance value in a preset range is acquired, in addition to the counting of the number of overexposed pixels and the number of underexposed pixels as the condition.

The illuminance value output unit 16 may output the illuminance value for a partial range in a screen, as well as the output of the illuminance value for the entire screen. The illuminance value output unit 16 may output all or some of the plurality of illuminance values for each region set inside a screen, as well as the output of one illuminance value for the entire or a part of the screen.

The solid-state imaging device 5 can measure the illuminance value suitable for an illuminance environment by appropriately changing a detectable illuminance range with a change in the illuminance measurement condition. Unlike the imaging of a subject image, the solid-state imaging device 5 can sufficiently measure the illuminance value suitable for an illuminance environment, even when the solid-state imaging device 5 does not perform accurate adjustment of the condition with respect to a change in lightness.

The solid-state imaging device 5 can shorten a time until the output of the illuminance value and reduce the power consumption, since it is not necessary to perform a process of normally optimizing the ES time and the AG for the output of the illuminance value. The solid-state imaging device 5 can suppress a variation in a time necessary to output the illuminance value by switching the illuminance measurement condition from the ES time and the AG determined in advance. Thus, the solid-state imaging device 5 can acquire the illuminance value in a short time using the configuration for imaging a subject image and can suppress a variation in a time necessary to acquire the illuminance value.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illuminance measuring method performed by a solid-state imaging device including an imaging unit, the method, comprising:
    capturing a subject image by the imaging unit in accordance with one of two or more illuminance measurement conditions set in advance by varying at least one of an electronic shutter time and an analog gain;
    integrating luminance values of pixels in the capturing the subject image, the imaging unit including the pixels;
    calculating an illuminance value based on an integration result of the luminance values;
    acquiring a number of overexposed pixels and a number of underexposed pixels in the capturing the subject image, the overexposed pixels being pixels in which saturation of an output occurs with respect to an amount of incident light from a subject, the underexposed pixels being pixels in which an output remains to be in a black level with respect to a change in the amount of incident light from the subject;
    outputting the calculated illuminance value as a result of illuminance measurement when the number of overexposed pixels and the number of underexposed pixels are both less than a threshold value; and
    capturing a subject image by the imaging unit in accordance with another of the two or more illuminance measurement conditions to calculate an illuminance value, when one of the number of the overexposed pixels and the number of underexposed pixels is greater than the threshold value,
    the two or more illuminance measurement conditions being set to overlap a range of illuminance values detectable for each illuminance measurement condition.

2. The illuminance measuring method according to claim 1, further comprising:
    retaining information regarding the electronic shutter time and the analog gain set for each of the two or more illuminance measurement conditions.

3. The illuminance measuring method according to claim 1, wherein each of the two or more illuminance measurement conditions is a product of the electronic shutter time and the analog gain.

* * * * *